(12) United States Patent
Markthub et al.

(10) Patent No.: US 12,443,547 B2
(45) Date of Patent: Oct. 14, 2025

(54) QUEUE-PAIR MANAGEMENT

(71) Applicant: MELLANOX TECHNOLOGIES, LTD., Yokneam (IL)

(72) Inventors: Pak Markthub, Tokyo (JP); James Dinan, Westford, MA (US); Sreeram Potluri, Milpitas, CA (US); Leonid Genkin, Kfar Saba (IL); Yossef Itigin, Hod Hasharon (IL); Shahar Refael Hasson, Tel Aviv (IL)

(73) Assignee: MELLANOX TECHNOLOGIES, LTD, Yokneam (IL)

( * ) Notice: Subject to any disclaimer, the term of this patent is extended or adjusted under 35 U.S.C. 154(b) by 105 days.

(21) Appl. No.: 18/229,075

(22) Filed: Aug. 1, 2023

(65) Prior Publication Data
US 2025/0045216 A1    Feb. 6, 2025

(51) Int. Cl.
*G06F 13/16* (2006.01)

(52) U.S. Cl.
CPC ................. *G06F 13/1668* (2013.01)

(58) Field of Classification Search
CPC .................................................. G06F 13/1668
See application file for complete search history.

(56) References Cited

U.S. PATENT DOCUMENTS

| | | | | |
|---|---|---|---|---|
| 2014/0229594 A1* | 8/2014 | Burke | ............... | H04L 41/0893 709/223 |
| 2015/0269067 A1* | 9/2015 | Pendharkar | ......... | G06F 11/3466 711/171 |
| 2018/0129629 A1* | 5/2018 | Sadasivam | .......... | G06F 12/0875 |
| 2019/0342199 A1* | 11/2019 | Hurson | ................. | H04L 47/263 |
| 2022/0121394 A1* | 4/2022 | Brewer | ................ | G06F 3/0619 |
| 2023/0276301 A1 | 8/2023 | Potluri et al. | | |
| 2023/0276422 A1 | 8/2023 | Agostini | | |

FOREIGN PATENT DOCUMENTS

| | | | | | |
|---|---|---|---|---|---|
| CN | | 111796574 A | * | 10/2020 | ......... G05B 23/0213 |
| KR | | 20090059337 A | * | 6/2009 | ............ G06F 8/447 |
| WO | WO 2022/037777 | | | 2/2022 | |
| WO | WO-2022037777 A1 | | * | 2/2022 | ............ H04L 47/50 |

OTHER PUBLICATIONS

English translation of CN-111796574-A (Year: 2020).*
Translation of KR-20090059337-A (Year: 2009).*
Koop et al. "MVAPICH-Aptus: Scalable High-Performance Multi-Transport MPI over InfiniBand," 2008 IEEE International Symposium on Parallel and Distributed Processing, Apr. 2008, 12 pages.

(Continued)

*Primary Examiner* — Henry Tsai
*Assistant Examiner* — John B Roche
(74) *Attorney, Agent, or Firm* — Sheridan Ross PC

(57) ABSTRACT

A system is described which monitors accesses to one or more peers using queue pairs (QPs). Each access is associated with a respective peer of the one or more peers. The system identifies, based on one or more of a rate and a count of the monitored accesses to the one or more QPs, a first peer of the one or more peers. In response to identifying the first peer, a reliable connection QP is established for the first peer of the one or more peers.

20 Claims, 4 Drawing Sheets

(56) References Cited

OTHER PUBLICATIONS

Koop et al. "Scalable MPI Design over InfiniBand using eXtended Reliable Connection," 2008 IEEE International Conference on Cluster Computing, Oct. 2008, 10 pages.
Vishnu et al. "Efficient On-Demand Connection Management Mechanisms with PGAS Models over InfiniBand," 2010 10th IEEE/ACM International Conference on Cluster, Cloud and Grid Computing, May 2010, 10 pages.
Yu et al. "Adaptive Connection Management for Scalable MPI over InfiniBand," Proceedings 20th IEEE International Parallel & Distributed Processing Symposium, Jun. 2006, 10 pages.
Extended Search Report for European Patent Application No. 24192341.6, dated Jan. 2, 2025, 11 pages.

* cited by examiner

QUEUE-PAIR MANAGEMENT

FIELD OF THE DISCLOSURE

The present disclosure is generally directed to systems, methods, and devices for transmitting data between nodes and, in particular, for providing memory efficient communication through queue-pair management.

BACKGROUND

In modern high-performance computing systems, communication between computing devices is typically facilitated by a network of interconnected nodes. Each computing device, which may contain a central processing unit (CPU), a graphics processing unit (GPU), and/or other hardware peripheral, can be considered a node in the network. Data is transmitted between such nodes in a series of discrete operations, with each node serving as a relay point for the data. This structure enables parallel processing and data sharing, significantly improving overall system performance and enabling complex computational tasks. Communication between nodes is governed by various protocols, which can vary depending on the specific requirements of the system and the type of devices involved.

The concept of queue pairs (QPs) supports efficient operation of these inter-network communications. A QP is composed of a work queue including a send queue and a receive queue, acting as endpoints for data transmission between nodes. The send queue holds instructions for outgoing data, while the receive queue accommodates incoming data instructions. QPs also require completion queues which signal the completion of work requests posted to the work queue. The use of QPs enables network technologies such as InfiniBand to provide high-speed, low-latency communication between nodes. The implementation and management of QPs, however, can be complex, necessitating detailed handling of data transmission protocols and error management.

Latency and memory consumption are key factors in the performance and efficiency of these communication networks. Latency refers to the delay experienced during data transmission between nodes, which can impact the overall performance in real-time or high-speed applications. Memory consumption on the other hand relates to the amount of memory resources utilized for data transmission and processing. High memory consumption can lead to inefficiencies, potentially slowing down other processes and limiting the overall system performance. Optimizing both latency and memory consumption is therefore a continuous challenge in the development and operation of high-performance computing systems. Various strategies and technologies are employed to tackle these issues, aiming to deliver fast, efficient, and reliable communication between devices.

Technical shortcomings of conventional computing system networks relating to memory consumption and latency negatively affect real-world applications involving, for example, artificial intelligence models, mathematical calculations, and other computationally-complex applications.

SUMMARY

In high-performance computing networks, QPs can be categorized into two types: reliably connected (RC) and dynamically connected (DC) QPs. Both RC and DC QPs facilitate communication between nodes within a network, providing a mechanism for transmitting and receiving data. However, while an RC QP establishes a dedicated, persistent connection between two nodes, with each node possessing its unique send and receive queues, DC QPs are more flexible, enabling a single QP on one node to establish transient connections with multiple other nodes dynamically. This dynamic connection capability of DC QPs means that a single QP on one node can be used to communicate with different nodes at different times.

The choice between using RC or DC QPs comes with advantages and trade-offs. RC QPs, due to their persistent connection nature, provide stable and reliable communication, making them well suited for long-lived, steady connections. They ensure in-order delivery of messages, but the need for dedicated resources for each connection can become a limitation when a node has to communicate with a large number of peers, leading to increased memory consumption. In contrast, DC QPs require less memory as they use a shared pool of resources to establish connections dynamically. This makes them a more memory-efficient choice when dealing with a high number of connections. Nonetheless, DC queue pairs might entail additional overhead or latency in managing the dynamic connections, and applications must be carefully designed to handle the transient nature of these connections, which can potentially increase the complexity of the application design and implementation.

As described herein, memory consumption and latency affecting communication between nodes of a network can be improved through a system or method of adapting to network behavior and utilizing either DC QPs or RC QPs to provide the communication. The systems and methods described herein may be used to manage the QPs used during communication for either This is useful for NVSHMEM communication, involving GPUs of different nodes directly communicating using QPs, Unified Communication X Framework (UCX), involving CPUs of different nodes communicating using QPs, and other communication libraries.

Illustratively, and without limitation, a computing device or system is disclosed herein to include one or more circuits to: monitor accesses to one or more peers using DC QPs, wherein each access is associated with a respective peer of the one or more peers; identify, based on one or more of a rate and a count of the monitored accesses to the one or more DC QPs, a first peer of the one or more peers; and in response to identifying the first peer, establish an RC QP for the first peer of the one or more peers.

In some embodiments, monitoring the accesses comprises reading a counter associated with the first peer. In some embodiments, the counter is stored in memory of a GPU, and the one or more circuits comprise one or more of a CPU and a network interface controller (NIC). In some embodiments, the counter is accessed by the CPU using loads and stores. In some embodiments, the counter is a first array including a field for each of the one or more peers, wherein the one or more circuits update a second array with instructions based on values in the first array. In some embodiments, the counter is one of a plurality of counters, wherein each counter is associated with a respective peer of the one or more peers. In some embodiments, the rate is a rate of an increase in the counter over a period of time. In some embodiments, identifying the first peer comprises determining the counter associated with the first peer is greater than a counter associated with a second peer. In some embodiments, the one or more circuits comprise a CPU, wherein the access to the one or more peers is performed by the CPU. In some embodiments, establishing the RC QP comprises creating a send queue and a receive queue in memory, wherein the CPU communicates with the first peer by writing a work request to the send queue. In some embodiments, the one or more circuits are further to: monitor accesses to one or more RC QPs; identify, based on one or more of a rate and a count of the monitored accesses to the RC QPs, a first RC QP of the one or more RC QPs, wherein the first RC QP is associated with a second peer of the one or more peers; and in response to identifying the first RC QP, terminate the first RC QP. In some embodiments, after terminating the first RC QP, communication with the second peer associated with the first RC QP is conducted using a DC QP. In some embodiments, terminating the first RC QP is further in response to determining a number of available slots for RC QPs. In some embodiments, the one or more circuits are further to determine a rank of each the one or more peers based on the one or more of the rate and the count of the monitored accesses. In some embodiments, the one or more circuits are further to establish an RC QP for one or more of the one or more peers based on the rank. In some embodiments, establishing the RC QP comprises determining a slot number for the RC QP and writing the slot number to a memory device. In some embodiments, establishing the RC QP further comprises storing a pointer to the RC QP in memory of a CPU.

In another example, a system is provided comprising one or more circuits to: increase a first counter associated with a first peer of a plurality of peers with each access to the first peer via one or more dynamically connected DC QPs, wherein the first counter is one of a plurality of counters, wherein each counter is associated with a respective peer of the plurality of peers; receive an RC slot number associated with the first peer; and in response to receiving the RC slot number, initiate an RC QP with the first peer. In some embodiments, the one or more circuits are further to: receive an indication to terminate the RC QP with the first peer; and in response to the indication to terminate the RC QP with the first peer, communicate with the first peer via one of the one or more DC QPs.

In yet another example, a networking device is provided, the networking device comprising: a first one or more circuits to: communicate with two or more peers via one or more DC QPs; and increase, for each access to the DC QPs, one of a plurality of counters, wherein each counter is associated with a respective one of the two or more peers; and a second one or more circuits to: monitor a value of each of the counters; identify, based on one or more of a rate and a count of the monitored value of each of the counters, a first peer of the two or more peers; and in response to identifying the first peer, establish an RC QP for the first peer of the one or more peers.

Additional features and advantages are described herein and will be apparent from the following Description and the figures.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

The present disclosure is described in conjunction with the appended figures, which are not necessarily drawn to scale.

DETAILED DESCRIPTION

Figure 1:
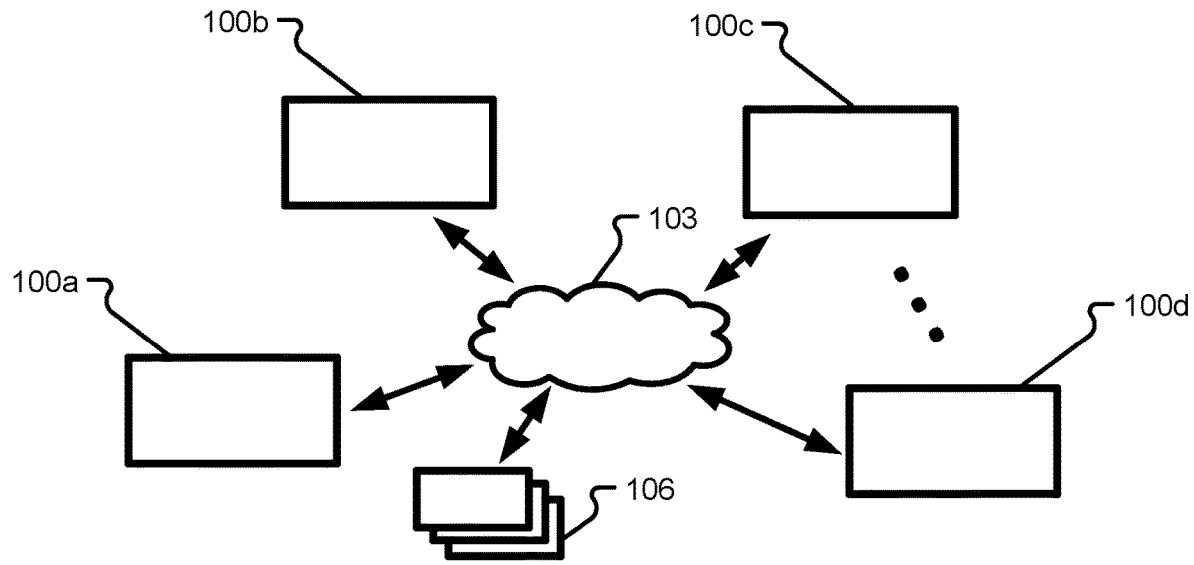
FIG. 1 is a block diagram of a networking environment in accordance with one or more of the embodiments described herein.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

The details of one or more aspects of the disclosure are set forth in the accompanying drawings and the description below. Other features, objects, and advantages of the techniques described in this disclosure will be apparent from the description and drawings, and from the claims.

The phrases "at least one," "one or more," and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as X1-Xn, Y1-Ym, and Z1-Zo, the phrase is intended to refer to a single element selected from X, Y, and Z, a combination of elements selected from the same class (e.g., X1 and X2) as well as a combination of elements selected from two or more classes (e.g., Y1 and Zo).

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The preceding Summary is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

Numerous additional features and advantages are described herein and will be apparent to those skilled in the art upon consideration of the following Detailed Description and in view of the figures.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

It will be appreciated from the following description, and for reasons of computational efficiency, that the components of the system can be arranged at any appropriate location within a distributed network of components without impacting the operation of the system.

Further, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a printed circuit board (PCB), or the like.

The terms "determine," "calculate," and "compute," and variations thereof, as used herein, are used interchangeably, and include any appropriate type of methodology, process, operation, or technique.

Various aspects of the present disclosure will be described herein with reference to drawings that may be schematic illustrations of idealized configurations.

Any of the steps, functions, and operations discussed herein can be performed continuously and automatically.

The systems and methods of this disclosure have been described in relation to a network of switches; however, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

A number of variations and modifications of the disclosure can be used. It would be possible to provide for some features of the disclosure without providing others.

References in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases may not necessarily refer to the same embodiment. Further, when a particular feature, structure, or characteristic is described in conjunction with one embodiment, it is submitted that the description of such feature, structure, or characteristic may apply to any other embodiment unless so stated and/or except as will be readily apparent to one skilled in the art from the description. The present disclosure, in various embodiments, configurations, and aspects, includes components, methods, processes, systems and/or apparatus substantially as depicted and described herein, including various embodiments, sub combinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The use of GPUs as a means to offload computationally-intensive tasks from CPUs and the use of networks of computing nodes to implement computationally-intensive tasks, whether executed by CPUs or GPUs, is increasingly important to users such as scientific researchers seeking to execute artificial intelligence (AI) models and other computationally-intensive processes. The growing demand for high-performance computing in various domains, including scientific simulations, machine learning, and image processing, has driven the need for efficient and cost-effective computational resources. The limitations of network communication performance and the increasing importance of parallelism have prompted researchers and other users to explore alternatives to the use of single computing devices for performing data processing. As a result, GPUs have emerged as an approach to offload computationally-intensive tasks from CPUs and networks of computing systems have become useful for executing complex processing applications.

By using a system or method as described herein, connections and communications between computing systems or nodes may be managed to improve memory requirements and consumption and to lessen latency. Through the systems and methods described herein, a computing device communicating with one or more peers may be enabled to switch between the use of RC QPs and DC QPs based on amounts of communication with particular peers.

A computing system as described herein may utilize QPs including work queues (WQs) and completion queues (CQs) to communicate with peers. Such a computing system may monitor communication over the QPs and switch between using DC QPs and RC QPs over time based on the communication. By switching between DC QPs and RC QPs as described herein, the computing system may reduce the overhead and latency associated with handling data communication with peers as described herein.

The systems and methods described herein may be used by computing systems in which a GPU communicates with GPUs of peers through NVSHMEM or other GPU-accelerated libraries. For example, embodiments of the present disclosure may include a GPU performing data packet preparation, scheduling, sending or transmission. Through such a system, workloads may be shifted from a CPU to computationally viable GPUs. In some embodiments, a CPU may be used for instructing one or more GPUs to perform various tasks (e.g., by instructing a GPU to communicate over an RC QP as opposed to a DC QP, or vice versa). Instructions by a CPU may be carried out using, e.g., general-purpose processing platforms such as the CUDA parallel computing platform. Such platforms may employ GPU accelerated signal processing (such as, for example, offered by the NVIDIA Aerial application framework including the cuBB software development kit for GPU accelerated 50 signal processing, and cuPHY for Layer 1 50 PHY). In some implementations, InfiniBand GPUDirect Async (IBGDA)-Kernel Initiated (GDA-KI) may be used to enable GPUs to prepare network work descriptors or work queue entries (WQEs) and submit such descriptors to a NIC.

In some implementations, systems and methods as described herein may be implemented without requiring the use of a GPU. For example, a CPU of a computing device may communicate with peers through, for example, UCX and/or other communication libraries. UCX as described herein is an acceleration library, integrated into the Open MPI and OpenSHMEM. UCX is a communication library designed to achieve the highest performance for HPC applications. UCX has a broad range of optimizations for achieving low-software overheads in communication path which allows near native-level performance.

When using GDA-KI or UCX in high performance computing (HPC) environments, RC QPs provide reliability, high message rate, high bandwidth, and remote direct memory access (RDMA) capability. However, RC QPs consume larger memory footprints as compared to DC QPs as RC QPs require the creation of n QPs per peer (e.g., 128 QPs per peer on DGX-A100). As networks increase in size, the required memory can be prohibitively large to fit in GPU and/or CPU memory. As a result, using DC QPs for some communications may be beneficial to reduce the overall memory consumption.

The systems and methods described herein enable a computing system to avoid utilizing RC QPs except for communicating with peers which the computing system communicates most frequently. Once a DC QP communication is established, communication with each peer over the DC QP is monitored. The most frequently communicated with peers may be automatically identified and an RC QP may be established or attempted to be established. Over time, the use of DC or RC QPs may be adjusted to account for changes in communication patterns. As a result, using a system or method as described herein, communication between peers may be handled in a memory efficient and low-latency manner.

Figure 2:
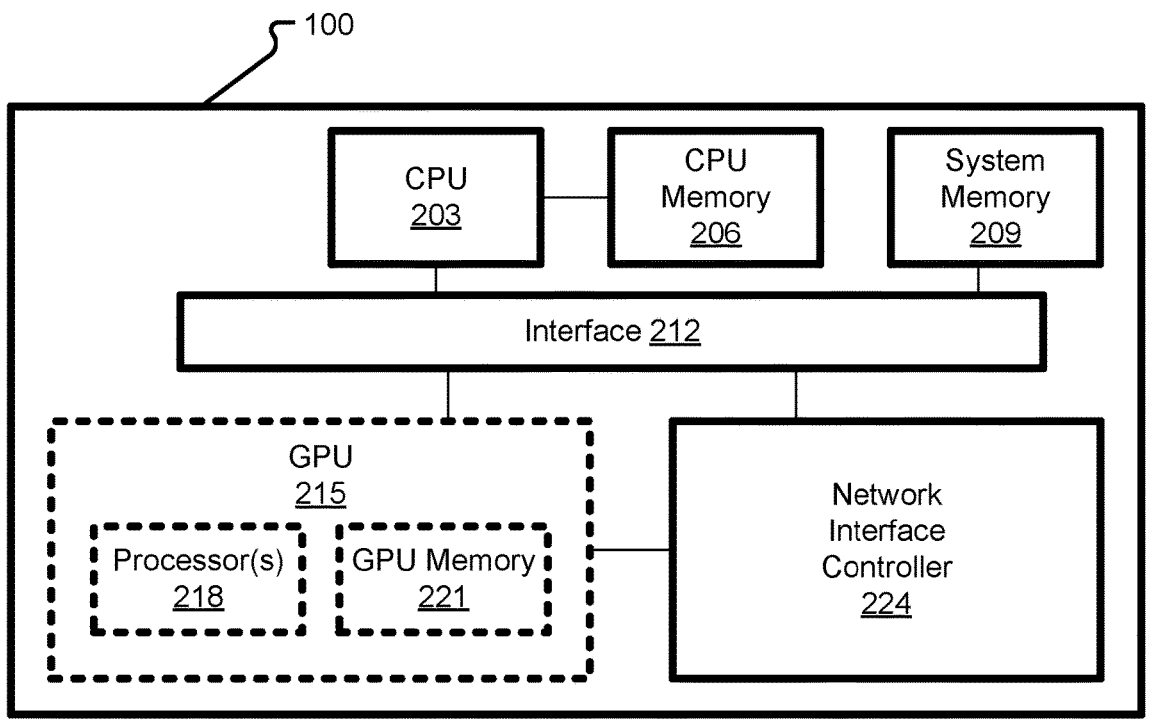
FIG. 2 is a block diagram of a computing system in accordance with one or more of the embodiments described herein.

Reference is now made to FIGS. 1 and 2, showing a nonlimiting block diagram of an exemplary computing environment in accordance with one or more embodiments. The environment may include one or more peers 100a-d communicating with each other via a network 103.

Each of the one or more peer computing systems 100a-d may connect to each other as well as to other peer devices 106 to access shared resources, services, and data, via the network 103. The peer computing systems 100a-d may be, for example, client devices such as personal computers, laptops, smartphones, IoT devices, as well as switches or servers, or any type of computing system capable of sending data to and receiving data over a network 103.

Each of the peer devices 106 may comprise network interfaces including, for example, a transceiver. Each peers 109a-b may be capable of receiving and transmitting packets in conformance with applicable protocols such as TCP, although other protocols may be used. Each peers 109a-b can receive and transmit packets to and from network 103.

In some implementations, one or more peer computing systems 100a-d and devices 106 may be switches, proxies, gateways, load balancers, etc. Such systems 100a-d and devices 106 may serve as intermediaries between clients and/or servers, relaying or modifying the communication between the clients and/or servers.

In some implementations, one or more systems 100a-d and devices 106 may be IoT devices, such as sensors, actuators, and/or embedded systems, connected to the networks 103. Such IoT devices may act as clients, servers, or both, depending on implementations and the specific IoT applications. For example, a first peer may be a smart thermostat acting as a client, while a second peer may be a central server for analysis or a smartphone executing an app.

As should be appreciated, in the realm of high-performance computing, a myriad of systems 100a-d can utilize QPs for network communication. For example, in server farms, data centers, or clusters used for big data analytics and scientific computing, CPUs and/or GPUs of systems 100a-d may use QPs to send and receive data between each other, such as via protocols including InfiniBand or Ethernet.

Moreover, the advent of general-purpose computing on GPU has led to widespread use of GPUs 215 for tasks beyond just rendering graphics, especially in fields like machine learning, deep learning, and data mining. GPUs 215 may be capable of handling thousands of threads simultaneously, making them well-suited for massively parallel tasks. To exchange data in network-connected multi-GPU systems or GPU-accelerated HPC clusters, GPUs of different systems 100a-d may utilize QPs for efficient communication. Using GDA-KI, for example, allows GPUs 215 of different systems 100a-d to communicate directly with each other over the network 103.

While one or more of the systems 100a-d communicating over the network 103 may communicate using systems and methods of managing QPs as described herein, it should be appreciated that the systems 100a-d may also communicate with other devices 106 which may or may not execute systems and methods of managing QPs as described herein.

The network 103 illustrated in FIG. 1 may rely on various networking hardware and protocols to establish communication between the peers 109a-b and the computing system. Such infrastructure may include one or more routers, switches, and/or access points, as well as wired and/or wireless connections. The network 103 may be, for example, a local area network (LAN) interconnecting peer computing systems 100a-d and devices 106. A LAN may use Ethernet or Wi-Fi technologies to provide communication between the peer computing systems.

In some implementations, the network 103 may be, for example, a wide area network (WAN) and may be used to connect peers 109a-b with the computing system 100. A WAN may comprise, for example, one or more of lines, satellite links, cellular networks. WANs may use various transmission technologies, such as leased lines, satellite links, or cellular networks, to provide long-distance communication. TCP communication over a WAN may be used, for example, to enable peer computing systems 100a-d to communicate reliably across vast distances. In some implementations, network 103 may comprise the Internet, one or more mobile networks, such as 4G, 5G, LTE, virtual networks, such as a VPN, or some combination thereof.

Data sent between the peer computing systems 100a-d over the network 103 may utilize the Transmission Control Protocol (TCP). When sending data over the network 103, a connection may be established between one or more of the computing systems 100a-d. As described herein, communication may be performed using either a DC QP or an RC QP. Once a connection using DC or RC QP is made, data may be exchanged in the form of packets, as described in greater detail below.

As should be appreciated, the computing systems 100a-d may be client devices and may encompass a wide range of devices, including desktop computers, laptops, smartphones, IoT devices, etc. Such computing systems 100a-d may execute one or more applications which communicate with other computing systems 100a-d to access resources or services. For example, a first computing system 100a may execute a web browser and a second computing system 100b may act as a web server. The first computing system 100a may communicate with the second computing system 100b to request and display web content. As another example, a first computing system 100a may execute a file-sharing application and a second computing system 100b may act as a file server. The first computing system 100a may communicate with the second computing system 100b to upload or download files. As another example, a first computing system 100a may act as an AI server capable of being used by a second computing system 100b to offload computationally-intensive processes for execution in parallel by one or more GPUs 215 of the first computing system 100a. Applications running on the computing systems 100a-d may be responsible for initiating communication with other computing systems 100a-d making requests for resources or services, and processing data received from the computing systems 100a-d. The network 103 may enable the computing systems 100a-d to communicate any number of concurrent communications with any number of computing systems 100a-d and/or devices 106 simultaneously.

It should also be appreciated that in some embodiments, the systems and methods described herein may be executed without a network 103 connection. For example, one or more computing systems 100a-d may be capable of communicating directly with other computing systems 100a-d without relying on any particular network 103.

FIG. 2 is a block diagram illustrating components of a computing system 100 which, according to some example implementations, may be capable of performing any one or more of the methods discussed herein.

As illustrated in FIG. 2, each computing system 100 may include one or more CPUs 203, one or more GPUs 215, and one or more NICs 224. Each of the CPUs 203, GPUs 215, and NICs 224 may communicate via an interface 212.

The NIC 224 of the computing system 100 may comprise one or more circuits capable of acting as an interface between components of the computing system 100, such as the CPU 203 and the GPU 215, and the network 103. The NIC 224 may enable data transmission and reception such that peer computing systems 100a-d may communicate with the computing system 100. A NIC 224 may comprise one or more of a peripheral component interconnect express (PCIe) card, a USB adapter, and/or may be integrated into a PCB such as a motherboard. The NIC 224 may be capable of supporting any number of network protocols such as Ethernet, Wi-Fi, fiber channel, etc.

As described herein, the NIC 224 may be capable of receiving packets from one or more peer computing systems 100a-d via the network 103. The NIC 112 may process a header of each received packet to determine whether each packet should be handled by the CPU 203 or the GPU 215. In some implementations, the NIC 224 may be in direct communication with each of the GPU(s) 215 and the CPU(s) 203 via the interface 212 as well as in external communication with the network 103 via, for example, Ethernet in combination with TCP.

One or more CPUs 203 of the computing system 100 may each comprise one or more circuits capable of executing instructions and performing calculations. The CPUs 203 may be capable of interpreting and processing data received by the computing system 100 via the NIC 224. CPUs 203 of a computing system 100 may each comprise one or more arithmetic logic units (ALUs) capable of performing arithmetic and/or logical operations, such as addition, subtraction, and bitwise operations. The CPUs 203 may also or alternatively comprise one or more control unit (CUs) which may be capable of managing the flow of instructions and data within the CPU 203. CUs of the CPU 203 may be configured to fetch instructions from CPU memory 206 or system memory storage device(s) 209, decode the instructions, and direct appropriate components to execute operations based on the instructions.

A CPU 203 of the computing system 100 may include, for example, a CPU, a reduced instruction set computing (RISC) processor, a complex instruction set computing (CISC) processor, a GPU, a digital signal processor (DSP) such as a baseband processor, an application-specific integrated circuit (ASIC), a field-programmable gate array (FPGA), a radio-frequency integrated circuit (RFIC), another processor (including those discussed herein), or any suitable combination thereof. Similarly, a GPU 118 as described herein may include a processor 218 such as a streaming multiprocessor (SM), a CPU, a RISC processor, a CISC processor, a DSP, a baseband processor, an ASIC, an FPGA, an RFIC, another processor (including those discussed herein), or any suitable combination thereof.

A CPU 203 and/or a processor 218 of a GPU 215 as described herein may incorporate multiple processing cores, allowing the CPU 115 (and/or the GPU 215) to execute multiple instructions simultaneously, and/or may be capable of performing hyperthreading to execute multiple threads concurrently.

One or more GPUs 118 of the computing system 100 may each comprise one or more circuits capable of acting as specialized processing components to handle computationally-intensive tasks, such as rendering graphics and performing complex mathematical calculations. GPUs 118 may be capable of parallel execution of general-purpose tasks alongside the CPUs 115.

Each GPU 118 may comprise one or more streaming multiprocessors (SMs), CUs, or processors 218, which may be responsible for executing instructions in parallel. Each SM, CU, or processor 218 of a GPU 118 may contain one or more processing cores or ALUs which may be capable of performing arithmetic and/or logical operations concurrently.

Each GPU 118 of the computing system 100 may be capable of executing tasks such as scientific simulations, machine learning, and data analysis. For example, a GPU 118 of the computing system 100 may be designed for operation in workstation environments, such as for performing scientific simulations, executing and/or training machine learning models, performing data analysis, etc.

The GPU 118 may execute one or more kernels. Kernels executed by the GPU 118 may perform specific, parallelizable tasks on the GPU 118. Such kernels may be written using GPU programming languages or frameworks, such as CUDA.

The interface 212 of the computing system 100 may comprise one or more circuits capable of connecting peripheral devices such as the NIC 112, one or more GPUs 118, and one or more CPUs 115 to a motherboard of the computing system 100, as well as one or more memory storage devices 124. The interface 212 of the computing system 100 may comprise one or more high-speed lanes. Each lane may be, for example, a serial lane, and may consist of a pair of signaling wires for transmitting and/or receiving data. The interface 212 may be, for example, a PCIe bus.

Figure 3:
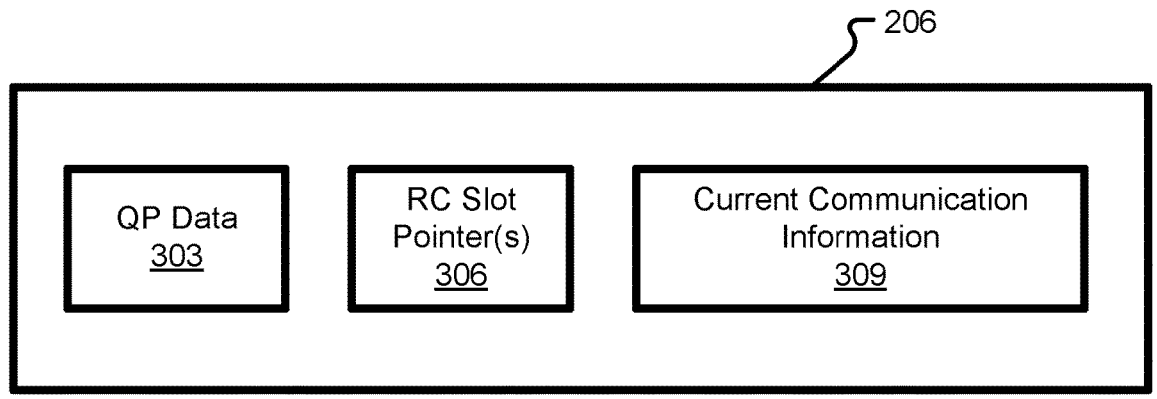
FIG. 3 is a block diagram of a memory device in accordance with one or more of the embodiments described herein.
Figure 4:
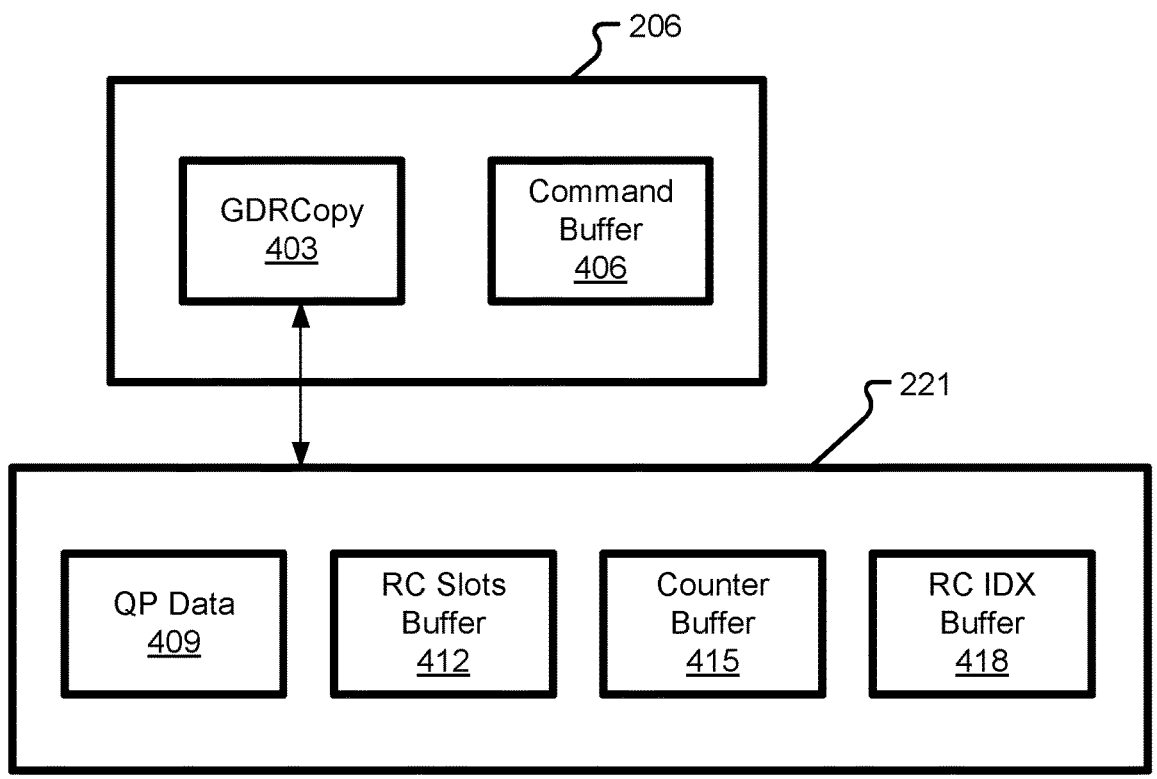
FIG. 4 is a block diagram of memory devices in accordance with one or more of the embodiments described herein.

The computing system 100 may further comprise one or more system memory storage devices 209, such as NVMe solid-state drives (SSDs). The system memory storage devices 209 may be capable of providing fast and efficient data access and storage. Each of the NIC 224, CPU 203, and GPU 215 may be capable of sending data to and reading data from the system memory storage devices 209 via the interface 212. Each of the NIC 112, the CPU 115, and the GPU 118 may also comprise one or more dedicated memory devices such as CPU memory 206 and GPU memory 221. Such memory storage devices may be as illustrated in FIGS. 3 and 4 and as described below.

The disclosed systems and methods may be adaptable and usable for both systems with and without GPUs 215. As described above, embodiments of the present disclosure may include a GPU 215 performing data packet preparation, scheduling, sending, and/or transmission. In some embodiments, the CPU 203 may instruct the GPU 215 (or multiple GPUs 215) to perform various tasks. Such platforms may employ GPU accelerated signal processing, such as by using GDA-KI to enable the GPU 215 to prepare network work descriptors or WQEs and submit such descriptors to the NIC 224.

Communication between computing systems 100a-d, whether between CPUs using UCX, GPUs using NVSHMEM, or otherwise, may utilize QPs to transmit and receive data across the network 103. Each QP may comprise two queues (a send queue and a receive queue) stored in memory of each system 100a-d participating in the communication. The send queue may be used to store packets or data to be transmitted to a peer, while the receive queue may be prepared to accept incoming packets or data from a peer. QPs provide a mechanism for matched communication, where every send operation from one system 100 has a corresponding receive operation on another system 100.

Each computing system 100 may utilize one or more QPs to establish communication channels with other systems 100 on the network 103. The process of enqueuing and dequeuing data to and from the send and receive queues may be handled by the systems' respective NICs, offloading the communication workload from the CPU.

As described herein, QPs used by computing systems 100a-d to communicate may utilize either RC QPs or DC QPs. Each of RC and DC QPs represents a different communication model and provides unique features and capabilities.

RC QPs are designed for one-to-one, connection-oriented communication between two endpoints in a network 103. Each RC QP represents a reliable, bidirectional communication path between two nodes. In other words, data transmitted from the send queue of an RC QP at one node is guaranteed to be delivered to the receive queue of the corresponding RC QP at the destination node, and in the correct order. This makes RC QPs highly suitable for use cases where data integrity and order preservation are critical.

On the other hand, DC QPs offer a connectionless communication model that allows one endpoint to communicate with multiple endpoints without maintaining a dedicated connection to each one. Using DC QPs, a source endpoint dynamically establishes a connection with a destination endpoint for each message transfer, allowing the source to send data to multiple destinations without the overhead of maintaining multiple connections. The DC establishment and teardown can provide increased scalability and flexibility, making DC QPs suitable for environments where one-to-many or many-to-many communications are common, and where the overhead of maintaining persistent connections can be prohibitive.

A DC QP can function as a dynamic connection initiator (DCI) or a dynamic connection target (DCT) A DCI establishes outgoing connections and is used for sending requests to DCTs. A DCI maintains the information necessary to communicate with multiple DCTs dynamically. A DCT, on the other hand, is a target for incoming connections. A DCT is relatively passive and waits for connection requests from DCIs. An application executing on a computing system 100 may create and manage multiple DC QPs, some as DCIs and others as DCTs, depending on its communication needs. This would allow it to handle both incoming and outgoing connections.

The choice between using RC or DC QPs comes with its advantages and trade-offs. RC QPs, due to their persistent connection nature, provide stable and reliable communication, making them well suited for long-lived, steady connections. RC QPs ensure in-order delivery of messages, but the need for dedicated resources for each connection can become a limitation when a node has to communicate with a large number of peers, leading to increased memory consumption. In contrast, DC QPs require less memory as they use a shared pool of resources to establish connections dynamically. This makes DC QPs a more memory-efficient choice when dealing with a high number of connections. Nonetheless, DC QPs might entail additional overhead in managing the dynamic connections, and applications must be carefully designed to handle the transient nature of these connections, which can potentially increase the complexity of the application design and implementation.

The CPU 115 of a computing system 100 may be responsible for processing instructions and managing data communication within the computing system 100. In the case of GPU communication using, for example, NVSHMEM, the CPU 115 may be tasked with establishing QPs which may be used by the GPU 215 to communicate. For each QP, a receive queue and a send queue may be stored in either CPU memory 206, GPU memory 221, or system memory 209.

Each receive queue may be accessed by a NIC 224 to store incoming data packets from peer computing systems 100a-d until the CPU 202 or GPU 215 is ready to process the packets. Similarly, a send queue may be used by the CPU 203 or GPU 215 to store data packets generated by the CPU 203 or GPU 215 before the data packets are transmitted to peer computing systems 100a-d via the NIC 224.

Each QP may include a number of data structures which consume memory in the respective computing system 100 to facilitate the operation of the QP. These data structures may include WQs, CQs, and doorbell records (DBRs).

WQs may be used to hold work requests (WRs) which represent operations to be performed. Each WQ may operate as a repository for WRs, and memory of the system 100 may include separate WQs for send and receive operations for each QP. Each WR in the WQs may contain information about the operation such as the type of operation, the location of the data, and other control information. Thus, each WQ consumes memory for every WR it holds, impacting the overall memory consumption of the QP.

CQs may be utilized to track a completion status of WRs. When an operation associated with a WR is completed, a completion event may be generated and placed into a CQ. Each QP may be associated with one or more CQs. Therefore, for each QP, memory may be consumed for the storage of completion events within these CQs.

DBRs may be used by software applications executing on the computing systems 100a-d to notify the CPU 203 and/or GPU 215 of new WRs on the WQs or to solicit completion notifications from the CQs. Each QP may be associated with a corresponding DBR, and the size of the DBR can impact the overall memory consumption of a QP.

As should be appreciated, memory consumption by a QP is not only about the send and receive queues, but also about the associated WQs, CQs, and DBRs. The overall memory footprint of a QP, therefore, can be significant, and the memory management strategy needs to take these factors into account.

The management of QPs may be controlled in different manners depending on whether communication between the computing systems 100a-d is performed via the CPU 203 or the GPU 323 of each system 100a-d. For example, as illustrated in FIG. 3, a system 100 which includes a CPU 203 which communicates using QPs without the involvement of a GPU 215 may be implemented. Such a CPU 203 may utilize CPU memory 206 containing QP data 303, one or more RCE slot pointers 306, and current communication information 309 as described below.

The current communications information 309 may be a list and/or a counter indicating an amount of data sent to and/or received from each peer. Every time a peer is accessed, whether by a DCI or by an RC QP, the counter associated with the peer may be increased. In this way, the current communication information 309 can be used by the CPU 203 to identify frequently accessed peers.

The current communication information 309 may be a counter which may be stored as a value in a memory location. In some implementations, the current communication information may be in the form of an array in which each entry in the array represents a different peer. As accesses to each peer are made, an entry in the array associated with the respective peer may be increased. The CPU 203 may monitor the changes to the current communication information 309 over time to determine a frequency at which each peer is accessed.

The CPU 203 may also track any RC QPs such as through the use of RC slot pointers 306 which may be stored in CPU memory 206. In some implementations, RC QPs may be associated with specific slots in memory of the computing system 100. Each RC QP may be linked with a unique location, or "slot," in memory. Each memory slot may contain one or more data structures for a respective RC QP, including send and receive WQs, CQs, and the DBRs. Each of these data structures holds specific information related to the operation of the RC QP, such as the WRs to be processed and completion statuses.

RC slots may enable a system 100 to manage memory resources efficiently by allocating and deallocating memory slots as needed when RC QPs are created or destroyed. In addition, linking RC QPs with distinct memory slots facilitates fast and efficient access to the QPs by the system. By knowing the memory slot associated with a specific RC QP, the system 100 can directly access the data structures of that QP without having to search through other areas of memory. This can enhance the speed and efficiency of the communications managed by the RC QPs.

In some implementations, the RC slots may be a fixed number. For example, the computing system 100 may limit the number of RC QPs being used at any given time. As described below, the system 100 may in some implementations keep the number of RC QPs in use constant, switching the RC QPs to be between the system 100 and the most frequently accessed peers over time.

In addition to tracking the RC slots and peer-related communication information, the CPU 203 may also monitor QP data 303 which may any queues or other data necessary for maintaining the DC and/or RC QPs.

As illustrated in FIG. 4, in some implementations, a GPU 215 may utilize QPs to communicate with other GPUs of other systems 100a-d by storing QP data 409 and other information in GPU memory 221. QP data 409 may comprise any queues or other data necessary for maintaining the DC and/or RC QPs. Using IBGDA, buffers may be initialized in the memory 221 of the GPU 215. These buffers may include an RC IDX buffer 418 and an RC slots buffer 412. Each element in the RC IDX buffer 418 may represent a peer with which the computing system 100 communicates via QP. The values in the RC IDX buffer 418 may represent whether the peer is being communicated with using a DC QP or an RC QP. If a particular peer is being communicated with using an RC QP, an entry in the RC IDX buffer 418 associated with the peer may indicate an RC slot which is being used to conduct the RC QP.

In effect, the RC IDX buffer 418 may indicate whether each destination peer has an RC QP or not, and if a particular destination peer has an RC QP, the RC IDX buffer 418 indicates which RC slot in the RC slot buffer 412 the QP information (e.g., the WQ, head-tail counters, etc.) is stored.

In some implementations, each element in the RC IDX buffer may be initialized with a negative one (−1) indicating each peer is being communicated with using a DC QP. As communications are switched to RC QPs, the RC IDX buffer 418 may be updated with an RC slot number for the particular peer utilizing the RC QP.

The CPU 203 of the system 100 may be configured to update the RC IDX buffer 418 by writing an RC slot number to an entry in the RC IDX buffer 418 associated with a particular peer when a new RC QP is ready for the peer.

The RC IDX buffer 418 may be initialized with each peer represented by a different entry and the value of the entry representing either DC communication or an RC slot. A negative one may inform the communication device to use a DCI when communicating with the peer, while an integer greater than or equal to zero may represent an RC slot which the communication device should use when communicating with the peer.

In some implementations, the RC slots buffer 412 can also be allocated upfront. Users may be enabled to specify how many RC slots are to be allocated, such as through an environment variable in the NVSHMEM library and/or IBGDA transport environment variable.

As described below in relation to the methods 500, 600 of FIGS. 5 and 6, IBGDA may utilize the RC slots buffer 412 and the RC IDX buffer 418 to determine the QP type—RC or DC—with which to communicate with a particular peer.

Furthermore, in addition to the standard elements (send queues, receive queues, completion queues), the RC IDX buffer 418, and the RC slots buffer 412, a counter buffer 415 may be maintained. The counter buffer 415 may show accesses to each peer using QPs. In a cluster with 15 nodes (n=15), each node being a system 100 performing a method of managing QPs as described herein may include fourteen (n−1) counters. Each entry in the counter buffer 415 may be associated with a different one of each of the peers with which the system 100 may communicate.

In some implementations, the counter buffer 415 may be stored in memory 221 onboard or in communication with a GPU 231. In some implementations, the counter buffer may be stored in CPU memory 206 onboard or in communication with a CPU 203. In some implementations, the counter buffer may be stored in another memory device such as system memory 209. In some embodiments, counters may be stored in NIC memory. In such an implementation, the CPU may be enabled to monitor values in counters stored in the NIC memory to determine a number of accesses to different peers. In some implementations, the counters may accessed by the CPU 203 using loads and stores.

Each time a peer is accessed, whether by a DCI or by an RC QP, the counter associated with the peer may be increased. In this way, the counter can be used to identify frequently accessed peers.

The memory and/or storage devices illustrated in FIGS. 3 and 4 may include, for example, main memory, disk storage, or any suitable combination thereof. The memory and/or storage devices may include, but are not limited to, any type of volatile or nonvolatile memory such as dynamic random-access memory (DRAM), static random-access memory (SRAM), erasable programmable read-only memory (EPROM), electrically erasable programmable read-only memory (EEPROM), Flash memory, solid-state storage, etc.

The memory and/or storage devices of the computing system 100 may store instructions such as software, a program, an application, or other executable code for causing at least any of the CPU 203, the GPU 215, and the NIC 224 to perform, alone or in combination, any one or more of the methods discussed herein. The instructions may in some implementations reside, completely or partially, within at least one of the memory/storage devices illustrated in FIGS. 3 and 4, or any suitable combination thereof.

In some embodiments, the electronic device(s), network(s), system(s), chip(s), circuit(s), or component(s), or portions or implementations thereof, of FIGS. 1-4, or some other figure herein, may be configured to perform one or more processes, techniques, or methods as described herein, or portions thereof. Such processes may be as depicted in FIGS. 5 and 6 and as described below.

Figure 5:
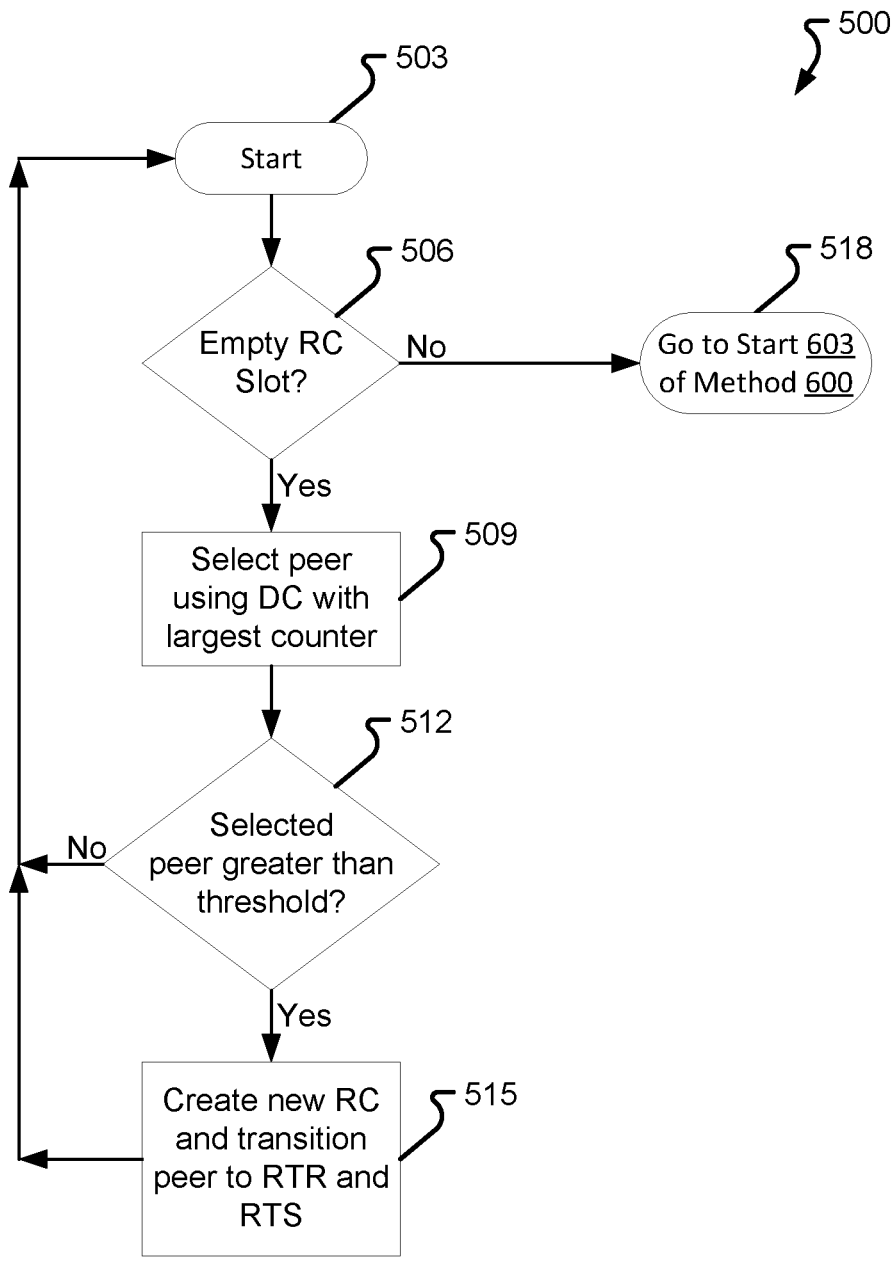
FIG. 5 is a flowchart of a method in accordance with one or more of the embodiments described herein.

A method 500 enabling a system 100 to provide communication in a low latency with highly efficient memory consumption is provided as illustrated in FIG. 5 in which a computing system 100 transitions peers using DC QPs for communication to RC QPs in an intelligent manner. The method 500 may be performed in some implementations by a system 100 using a CPU 213 to communicate with other systems through QPs via, for example, the UCX framework. In some implementations, the method 500 may be executed in a system in which a GPU 215 communicates with other systems using QPs via, for example, NVSHMEM.

Prior to the method 500, an initial setup phase may be performed to prepare the system 100 for communication.

The system 100 may begin by creating a number of DCIs. Other nodes connected to the system 100 may likewise create a number of DCIs. When communication begins between systems 100 on the network 103, communication may begin by using DC QPs for communication.

In some implementations, a single computing system 100 on the network may execute a plurality of processes and/or applications. Each process and/or application may be considered a separate peer. When communication between such processes and/or applications on different systems 100 over the network 103 begins, the communication may be initialized as a DC QP. A benefit of using DC QPs for communication, particularly in the initialization stage of a cluster, is that the number of DCI QPs can remain constant as the number of nodes in the cluster changes.

Because a single DCI QP may be used to communicate with any number of peers, it may be possible for a computing system 100 to communicate with all other peers on the network 103 using a single DCI QP. However, for maximum performance, a plurality of DCI QPs may be initialized.

In the case of communication via a GPU 215, a CPU 203 may create each of the DC QPs in memory of the GPU 215.

The method 500 may begin at 503 at which time communications using DC QPs between systems 100a-d in a network 103 such as illustrated in FIG. 1 are in progress.

At 506, a determination may be made as to whether an empty RC slot exists. In some implementations, a CPU 203 of the system 100 may be tasked with determining whether there is an available, or empty, slot for an RC QP in the system's memory. The CPU 203 may execute this in a number of ways, such as by iterating over the RC slots buffer 412 in GPU memory 221, over the RC slot pointers 306 in CPU memory 206, or by otherwise examining slots allocated for RC QPs in memory of the system 100, examining each slot in turn. If the CPU 203 encounters a slot that is not currently associated with any active RC QP, signifying an empty slot, the CPU 203 may halt the iteration and recognize that slot as being available for a new RC QP. Alternatively, the CPU may continue the iteration until it has examined all slots, and then select a most suitable slot based on predefined criteria.

If an empty RC slot exists, the method 500 may continue on to 509. If no empty RC slot exists, the method 600 described below may be utilized to switch an existing RC QP to DC.

As communication between the computing system 100 and peers takes place using DC and RC QPs, the CPU 203 may constantly or periodically monitor the amount of traffic between the computing system 100 and each of the peers.

Monitoring the amount of traffic between the computing system 100 and each of the peers may comprise an element of the system 100 tracking an amount of data or packets received by and/or transmitted to each peer with which the system 100 is in communication. This process of tracking the amount of data or packets received by and/or transmitted to each peer with which the system 100 is in communication may be performed by the CPU 203, the GPU 215, the NIC 224, or some combination thereof. In some implementations, a counter may be increased with each data transaction, such as the receipt or transmission of one packet from or to a peer. As described above, counters may be stored in memory and may increase over time as data is sent to and from peers.

The act of monitoring the amount of traffic between the computing system 100 and each of the peers may also comprise the CPU 203 reading or polling or otherwise accessing values of the counters to determine which peer or peers are the most frequently accessed. It should be appreciated that the CPU 203 may read the values of counters in many ways. In some implementations, the counters may be stored in GPU memory 221 and the CPU 203 may use a function such as GDRCopy 403 to read the data from the GPU memory 221.

For the CPU 203 to read data from the GPU 215, the CPU 203 may initiate a GDRCopy operation by first mapping the GPU memory 221 into the CPU's address space using GDRCopy library functions to create a consistent view of the GPU memory 221 for the CPU 120. Once the GPU memory 221 is mapped, the CPU 203 can directly access the data stored in the GPU memory 221.

It should be appreciated that in other implementations, such counters may be monitored by the CPU 203 in other ways. Tracking how many times the computing system 100 has communicated with each peer enables the CPU 203 to determine with which peer the system 100 should create an RC connection.

In some implementations, the determination of the peer using DC with the largest counter may be an estimation. A small inaccuracy in the determination may be acceptable and not impact the outcome of the method 500. For example, if there are two peers which have similar access frequency, creating an RC for either of them will not greatly impact the final performance. By accepting this imperfection, non-atomic read-modify-write may be used which incurs lower overhead as compared to atomic read-modify-write and may be preferable from the perspective of performance.

In some implementations, NVSHMEM may be used to spawn a proxy thread to monitor requests from GPU 215. Such a proxy thread may be extended to monitor the access counter buffer 415 stored in GPU memory 221 as well as to create a new RC QP in GPU memory 221.

By reading counter values, the CPU 203 may monitor accesses by the system 100 to peers using both DC and RC QPs. In this way, the CPU 203 may be enabled to determine which peers are more frequently accessed as compared to other peers, regardless of the QP type.

In some implementations, the QP communication may be handled directly by the CPU 203 and a GPU 215 may be an optional component. In such an implementation, the CPU 203 may simply keep a list of peers for all connections being used and increase a counter associated with the peers in the list with each access.

The CPU 203 can track a rate of change of the counter values. In some implementations, the CPU 203 may be designed to track the values of the access counters over a specified duration to establish which among the peers increases at the fastest rate or which exceeds an absolute value. The CPU 203 may periodically poll or sample the counters at regular time intervals, storing each new value along with a timestamp in a suitable data structure in memory.

The CPU may in some implementations perform analysis relating to the collected counter data to compute, for example, a rate of increase for each counter such as by determining a difference in counter values between successive samples and dividing by the time elapsed, resulting in a rate of change per unit of time. If the computed rate of change surpasses a certain threshold, the CPU 203 may flag the corresponding counter or peer. Alternatively, the CPU 203 may compare the absolute values of the counters against a specified threshold. If a counter's value exceeds this threshold, it may be flagged. By conducting this analysis, the CPU can identify which counter is increasing most rapidly, providing valuable insights for system monitoring, performance tuning, or troubleshooting procedures.

As an example, a monitoring thread of the CPU 203 can periodically capture the access counter buffer values and may keep a history of those captures for further analysis. The CPU 203 can then analyze the communication that was performed during a particular amount of time as opposed to during the entire amount of time that the system 100 is active.

In some implementations, the CPU 203 may extend its monitoring capabilities to other factors, such as the number of RC QP slots currently being used and/or the memory consumed by each QP. For example, the CPU 203 may maintain a count of active RC QP slots in memory of the system 100 and periodically update this count as QPs are created or destroyed. Additionally, the CPU 203 may track the memory allocation associated with each QP such as by monitoring a memory footprint of each QP's WQ, CQ, and/or DBR. By tracking these elements, the CPU may have comprehensive insight into the system's resource utilization, helping to optimize resource allocation, improve system performance, and ensure system stability.

The CPU 203 can in some implementations take a difference between counter values at a current time and at an earlier time in history and check whether the number of peers communicated with by the system which use DC during the last time slice is greater than a number of available DCIs. If so, the maximal element in the vector can be identified and as described below, a determination may be made as to whether the number of communications performed over a particular amount of time exceeds a threshold.

At 509, the CPU 203 may select the peer which uses DC QPs, and which is associated with the largest counter value. As described above, the largest counter value may be a largest absolute value or may be a greatest amount of change in a particular amount of time. At 512, the CPU 203 may determine whether the selected peer's counter is greater than a threshold. The threshold as described herein may be a parameter and may be set by a user or may be automatically set by the CPU based on a variety of factors. In some implementations, the threshold may be exposed to users or may be kept internal.

If, at 512, the selected peer's counter value is not greater than the threshold, the method 500 may comprise returning to the start 503. If, at 512, the selected peer's counter value is greater than the threshold, the method 500 may comprise, at 515, creating a new RC QP for the selected peer and transitioning communication with the peer to reliable connected services (RCS).

Creating the RC QP for the selected peer may comprise instructing the peer to begin communicating via RC. For example, the CPU may send instructions to the peer for which the RC QP is to be established, instructing the remote peer to create the RC QP on its side. This may involve exchanging some connection information with the remote peer, such as a QP number and a Local Identifier (LID) for InfiniBand networks. Once the remote peer has this information, it can set up its own QP and transition it to the RTS state.

In some implementations, transitioning a selected peer to RCS may comprise preparing the QP in memory, sending instructions to the peer, setting a QP to a ready-to-receive (RTR) state, followed by a ready-to-send (RTS) state. Once the RC QP has entered the RTR state, the RC QP is ready to receive incoming messages or data packets from the corresponding remote QP on the peer side.

In some implementations, instructing the peer to participate in the new RC QP creation (or destruction) may comprise using the existing DC QP or any other method of communication. For example, a pre-established RC QP, message passing interface (MPI) or TCP/Internet Protocol (TCP/IP), may be used for this synchronization.

In some implementations, creating the new RC QP may comprise storing a command buffer 406 in memory on the CPU. The command buffer 406 may be utilized to request a new connection establishment, in which the requesting system 100 sends information relating to the RC QP along with a request message. When the peer side receives the request command, the peer side can determine whether the peer side system has an unused or available RC QP slot. If the peer side has an available RC slot, the peer side can return an acknowledgement (ACK). If, on the other hand, the remote peer declines the RC QP, the system may receive a non-acknowledgement (NAK) from the peer.

If the peer rejects the offer to switch to RC, the method 500 may in some implementations involve choosing a different peer using DC with a relatively large counter value to switch to RC. On the other hand, if the requesting system 100 receives an ACK from the peer, the system may begin transitioning the RC QP to RTR and RTS.

Once the RC QP is initialized and ready, the CPU 203 may in some implementations program an RC slots buffer to reflect the new RC QP and an RC IDX buffer in GPU memory 221 to instruct the GPU 215 to communicate via the new RC QP. Updating the GPU memory 221 may comprise the CPU 203 using GDRCopy, or another communication means to write to the GPU memory 221. After the GPU memory 221 is updated to reflect the new RC QP, in the next iteration the GPU processor 235 may see the RC-ready mark and use RC QPs instead of DC QPs.

After initializing the new RC QP and, in the case of using the GPU 215 to communicate with the peer using the RC QP, updating the GPU memory 221, the method 500 may comprise returning to the start 503.

Figure 6:
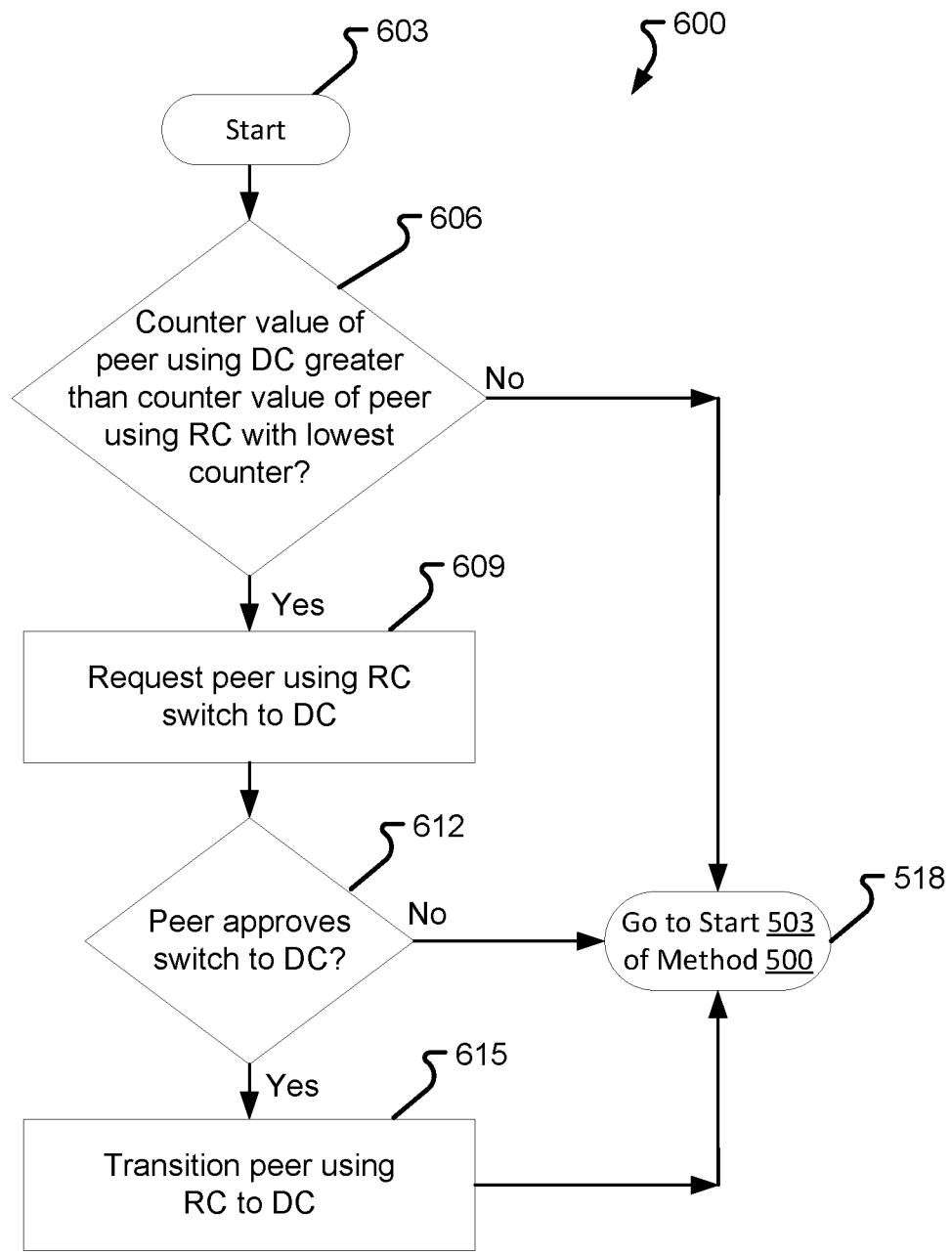
FIG. 6 is a flowchart of a method in accordance with one or more of the embodiments described herein.

A method 600 enabling a computing system 100 to transition lesser used peers from RC QPs to DC QPs is described herein and illustrated in FIG. 6. In some implementations, the method 600 of FIG. 6 may be performed in response to certain aspects of the method 500 illustrated in FIG. 5. For example, if at 506 no empty or available RC slot is identified, the method 500 may, at 518, end and the method 600 may begin at 603. As a result of method 600, an existing RC slot being used for a communication with a peer in which data is transmitted less frequently than a communication with a peer which uses a DC QP may be freed and made available. Next, the method 500 may be used to transition the communication with the peer which uses the DC QP. In this way, the most frequently communicated with peers may be communicated with using RC QPs as opposed to DC QPs.

As usage of applications progress over time, usage patterns may change. Based on the changes in usage patterns, some peers which previously often communicated may no longer be the most frequently communicated with applications. To maintain memory consumption efficiency and low latency, IBGDA may be used to repurpose one or more RC slots with new connections to peers in which more frequent access is observed.

Because it may not be possible for RC QPs to be transitioned out of RTS except as a result of an error, the RC QPs being used for peers with which communication takes place less frequently may be destroyed and new RC QPs may be created for the DC QP communications in which communication takes place more frequently.

By implementing the method 600 illustrated in FIG. 6, RC QPs with peers which are no longer considered as frequent access may be reclaimed and used for other peers. The peers which are no longer considered frequent can be downgraded from RC to DC.

The method 600 may be useful in situations where an RC QP is not being used as often as previously or where a DC QP is being used more often than previously.

Because the number of RC slots available for communication may be limited, by actively switching more frequently communicated with peers from DC to RC and less frequently communicated peers from RC to DC may maximize the usage of RC slots, while enabling reductions in memory consumption and improvements in latency. However, it should also be appreciated that not every RC slot may be used at all times. There may be situations in which an RC slot may remain empty or available for extended amounts of time.

At the start 603 of the method 600, multiple communications between the computing system 100 and peers, such as peer computing systems 100a-d and/or other types of peer devices 106 are in progress. Such communications include one or more communications using DC QPs and one or more communications using RC QPs. The CPU 202 may be monitoring communications to the peers by, for example, polling or reading counter values as described above. As described above, for QPs handled by the CPU 203, the CPU 203 may keep a list of peers for all connections being used. The list may include a counter for each peer which may be increased with each access for the respective peer. For QPs handled by the GPU, a counter buffer 415 in GPU memory 221 may be copied by the CPU 203 to CPU memory 206 or to system memory 209 using, for example, GDRCopy 403.

At 606, the CPU 203 may determine if a counter value of any peer using DC QP for communication is greater than a counter value of any peer using an RC slot. The determination of whether a counter value of any peer using DC QP for communication is greater than a counter value of any peer using an RC slot may be made based on an analysis by the CPU 203 of the counter values for the communications.

In some implementations, instead of determining a counter value of any peer using DC QP for communication is greater than a counter value of any peer using an RC slot, a determination may instead be made as to whether a counter value of any peer using an RC slot is less than or equal to a threshold, similar to block 512 of the method 500 in FIG. 5 discussed above.

If no counter value of any peer using DC QP for communication is greater than any counter value of a peer using an RC slot, the method 600 may end and instead method 500 may be used to determine whether any RC slots are available. If, on the other hand, a counter value of any peer using DC QP for communication is greater than a counter value of any peer using an RC slot, the method 600 may proceed to 609 at which the peer using RC may be requested to switch or downgrade the communication to DC.

At 609, the peer using RC may be requested to switch to DC. To request the peer using RC switch to DC, the CPU 203 may transmit a request to the peer, similar to as may be performed in block 515 of method 500 as described above.

In some implementations, the CPU 203 may request the peer to switch the mode of communication from using an RC QP to a DC QP by sending a request through one of a variety of channels. One such channel may be the existing DC QP. Alternatively, the request may be sent over an RC QP, or the CPU 203 may use TCP to send the request.

Regardless of the method used, once the request is received by the target peer, the peer can begin the process of transitioning from an RC QP to a DC QP, as per the request.

In some implementations, the peer may respond to the request from the CPU 203 to transition from RC to DC by sending either an ACK or a NAK. For example, upon receipt of the request, the peer may assess its current state, its capacity to facilitate such a change, and the benefits of switching to a DC QP for communication. Following this assessment, it may send an appropriate response back to the CPU 203.

At 612, the CPU 203 may determine whether the peer approves the switch to DC. If the peer determines that the switch to DC QP is not feasible or may lead to a degradation of communication efficiency, it may send a NAK back to the CPU 203. The NAK may serve as a negative response, indicating that the peer has received the request but is unable or unwilling to comply. This negative acknowledgment can inform the CPU 203 that the requested transition will not succeed, and the CPU may instead maintain the existing communication method with the peer. Following the NAK, the method 600 may return to the start 503 of method 500 of FIG. 5 as described above.

On the other hand, if the peer determines that the switch to DC QP is feasible and/or beneficial, the peer may send an ACK back to the CPU. The ACK signal may serve as a positive response, indicating that the peer has successfully received the request and is willing to initiate the process of transitioning from RC QP to DC QP. This acknowledgment may trigger the CPU 203 to start any preparatory measures on its side to facilitate the transition.

At 615, upon receiving an ACK from the peer, the CPU 203 may proceed to transition the peer from RC to DC. On the peer-side, upon receiving and acknowledging the request, the peer can start the transition to a DC QP by setting up the necessary parameters, such as a destination address and queue pair number.

For a computing system 100 using QPs handled by the CPU 203, upon receiving the ACK from the peer, the CPU 203 can start the transition from the RC QP to a DC QP by setting up the necessary parameters, such as the destination address and queue pair number. Once these parameters are established, the RC QP may be destroyed.

For a computing system 100 using QPs handled by the GPU 215, the CPU 203 may update an RC IDX buffer 418 entry associated with the peer in the GPU memory 221 using, for example, GDRCopy. Updating the RC IDX buffer 418 may comprise setting or removing a value in the RC IDX buffer 418. For example, a zero or positive number stored in an entry of the RC IDX buffer 418 associated with a particular peer may indicate the peer should be communicated with using an RC slot of a number matching the entry. A negative one (−1) is stored in the entry may indicate DC should be used.

In the next iteration, GPU processor 218 may observe the entry in the RC IDX buffer 418 and avoid using the RC QP for the peer and instead use a DC QPs to communicate with the peer. Once the communication with the peer has transitioned to DC, the GPU processor 218 may write a flag or a one in an RC slots buffer 412 entry associated with the peer. For example, in some implementations, each entry in the RC slots buffer 412 may include a flag to indicate whether that RC QP is being used. The CPU monitoring thread may read the RC slots buffer 412 entry for the peer to know when and whether it can destroy the RC QP for the peer.

The CPU thread may monitor the RC slots buffer 412 in the GPU memory 221 and wait for the RC QP to be properly drained. Once drained, the CPU thread may remove the RC QP data 409 from the GPU memory 221, effectively destroying the existing RC QP. After transitioning the peer using RC to DC, return to the start 503 of the method 500.

The present disclosure encompasses embodiments of the methods 500, 600 that comprise more or fewer steps than those described above, and/or one or more steps that are different than the steps described above.

The present disclosure encompasses methods with fewer than all of the steps identified in FIGS. 5 and 6 (and the corresponding description of the method), as well as methods that include additional steps beyond those identified in FIGS. 5 and 6 (and the corresponding description of the method). The present disclosure also encompasses methods that comprise one or more steps from one method described herein, and one or more steps from another method described herein. Any correlation described herein may be or comprise a registration or any other correlation.

Embodiments of the present disclosure include a system comprising one or more circuits to: monitor accesses to one or more peers using DC QPs, wherein each access is associated with a respective peer of the one or more peers; identify, based on one or more of a rate and a count of the monitored accesses to the one or more DC QPs, a first peer of the one or more peers; and in response to identifying the first peer, establish an RC QP for the first peer of the one or more peers.

Embodiments of the present disclosure also include a system comprising one or more circuits to: increase a first counter associated with a first peer of a plurality of peers with each access to the first peer via one or more DC QPs, wherein the first counter is one of a plurality of counters, wherein each counter is associated with a respective peer of the plurality of peers; receive an RC slot number associated with the first peer; and in response to receiving the RC slot number, initiate an RC QP with the first peer.

Aspects of the above systems and networking device include wherein monitoring the accesses comprises reading a counter associated with the first peer.

Aspects of the above systems and networking device include wherein the counter is stored in memory of a GPU, and the one or more circuits comprise one or more of a CPU and a NIC.

Aspects of the above systems and networking device include wherein the counter is accessed by the CPU using loads and stores.

Aspects of the above systems and networking device include wherein the counter is a first array including a field for each of the one or more peers, wherein the one or more circuits update a second array with instructions based on values in the first array.

Aspects of the above systems and networking device include wherein the counter is one of a plurality of counters, wherein each counter is associated with a respective peer of the one or more peers.

Aspects of the above systems and networking device include wherein the rate is a rate of an increase in the counter over a period of time.

Aspects of the above systems and networking device include wherein identifying the first peer comprises determining the counter associated with the first peer is greater than a counter associated with a second peer.

Aspects of the above systems and networking device include wherein the one or more circuits comprise a CPU, wherein the access to the one or more peers is performed by the CPU.

Aspects of the above systems and networking device include wherein establishing the RC QP comprises creating a send queue and a receive queue in memory, wherein the CPU communicates with the first peer by writing a work request to the send queue.

Aspects of the above systems and networking device include wherein the one or more circuits are further to: monitor accesses to one or more RC QPs; identify, based on one or more of a rate and a count of the monitored accesses to the RC QPs, a first RC QP of the one or more RC QPs, wherein the first RC QP is associated with a second peer of the one or more peers; and in response to identifying the first RC QP, terminate the first RC QP.

Aspects of the above systems and networking device include wherein, after terminating the first RC QP, communication with the second peer associated with the first RC QP is conducted using a DC QP.

Aspects of the above systems and networking device include wherein terminating the first RC QP is further in response to determining a number of available slots for RC QPs.

Aspects of the above systems and networking device include wherein the one or more circuits are further to determine a rank of each the one or more peers based on the one or more of the rate and the count of the monitored accesses.

Aspects of the above systems and networking device include wherein the one or more circuits are further to establish an RC QP for one or more of the one or more peers based on the rank.

Aspects of the above systems and networking device include wherein establishing the RC QP comprising determining a slot number for the RC QP and writing the slot number to a memory device.

Aspects of the above systems and networking device include wherein establishing the RC QP further comprises storing a pointer to the RC QP in memory of a CPU.

Aspects of the above systems and networking device include wherein the one or more circuits are further to: receive an indication to terminate the RC QP with the first peer; and in response to the indication to terminate the RC QP with the first peer, communicate with the first peer via one of the one or more DC QPs.

Aspects of the above systems and networking device include any one or more of the features as substantially disclosed herein in combination with any one or more other features as substantially disclosed herein.

Aspects of the above systems and networking device include any one of the aspects/features/embodiments in combination with any one or more other aspects/features/embodiments.

Aspects of the above systems and networking device include any use of any one or more of the aspects or features as disclosed herein.

It is to be appreciated that any feature described herein can be claimed in combination with any other feature(s) as described herein, regardless of whether the features come from the same described embodiment.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system comprising one or more circuits to:
monitor accesses to one or more peers using dynamically connected (DC) queue pairs (QPs), wherein each access is associated with a respective peer of the one or more peers;
identify, based on one or more of a rate and a count of the monitored accesses to the one or more DC QPs, a first peer of the one or more peers; and
in response to identifying the first peer, store a pointer to a reliable connection (RC) QP for the first peer of the one or more peers in a memory of a central processing unit (CPU) and establish the RC QP for the first peer.

2. The system of claim 1, wherein monitoring the accesses comprises reading a counter associated with the first peer.

3. The system of claim 2, wherein the counter is stored in a memory of a graphics processing unit (GPU), and the one or more circuits comprise one or more of the CPU and a network interface controller (NIC).

4. The system of claim 3, wherein the counter is accessed by the CPU using loads and stores.

5. The system of claim 2, wherein the counter is a first array including a field for each of the one or more peers, and wherein the one or more circuits update a second array with instructions based on values in the first array.

6. The system of claim 2, wherein the counter is one of a plurality of counters, and wherein each counter is associated with a respective peer of the one or more peers.

7. The system of claim 2, wherein the rate is a rate of an increase in the counter over a period of time.

8. The system of claim 2, wherein identifying the first peer comprises determining the counter associated with the first peer is greater than a counter associated with a second peer.

9. The system of claim 1, wherein the one or more circuits comprise one or more of the CPU and a graphics processing unit (GPU), and wherein the access to the one or more peers is performed by the one or more of the CPU and the GPU.

10. The system of claim 9, wherein establishing the RC QP comprises creating a send queue and a receive queue in memory, and wherein one or more of the CPU and the GPU communicates with the first peer by writing a work request to the send queue.

11. The system of claim 1, wherein the one or more circuits are further to:
- monitor accesses to one or more RC QPs;
- identify, based on one or more of a rate and a count of the monitored accesses to the RC QPs, a first RC QP of the one or more RC QPs, wherein the first RC QP is associated with a second peer of the one or more peers; and
- in response to identifying the first RC QP, terminate the first RC QP.

12. The system of claim 11, wherein, after terminating the first RC QP, communication with the second peer associated with the first RC QP is conducted using a DC QP.

13. The system of claim 11, wherein terminating the first RC QP is further in response to determining a number of available slots for RC QPs.

14. The system of claim 1, wherein the one or more circuits are further to determine a rank of each of the one or more peers based on the one or more of the rate and the count of the monitored accesses.

15. The system of claim 14, wherein the one or more circuits are further to establish an RC QP for one or more of the one or more peers based on the rank.

16. The system of claim 1, wherein establishing the RC QP comprises determining a slot number for the RC QP and writing the slot number to a memory device.

17. A system comprising one or more circuits to:
- increase a first counter associated with a first peer of a plurality of peers with each access to the first peer via one or more dynamically connected (DC) queue pairs (QPs), wherein the first counter is one of a plurality of counters, wherein each counter is associated with a respective peer of the plurality of peers;
- receive a reliable connection (RC) slot number associated with the first peer; and
- in response to receiving the RC slot number, initiate an RC QP with the first peer.

18. The system of claim 17, wherein the one or more circuits are further to:
- receive an indication to terminate the RC QP with the first peer; and
- in response to the indication to terminate the RC QP with the first peer, communicate with the first peer via one of the one or more DC QPs.

19. A networking device, comprising:
a first one or more circuits to:
- communicate with two or more peers via one or more dynamically connected (DC) queue pairs (QPs); and
- increase, for each access to the DC QPs, one of a plurality of counters, wherein each counter is associated with a respective one of the two or more peers; and a second one or more circuits to:
- monitor a value of each of the counters;
- identify, based on one or more of a rate and a count of the monitored value of each of the counters, a first peer of the two or more peers; and
- in response to identifying the first peer, establish a reliable connection (RC) QP for the first peer of the one or more peers.

20. The networking device of claim 19, wherein the rate is a rate of an increase in one or more of the counters over a period of time.

* * * * *